Figure 7:
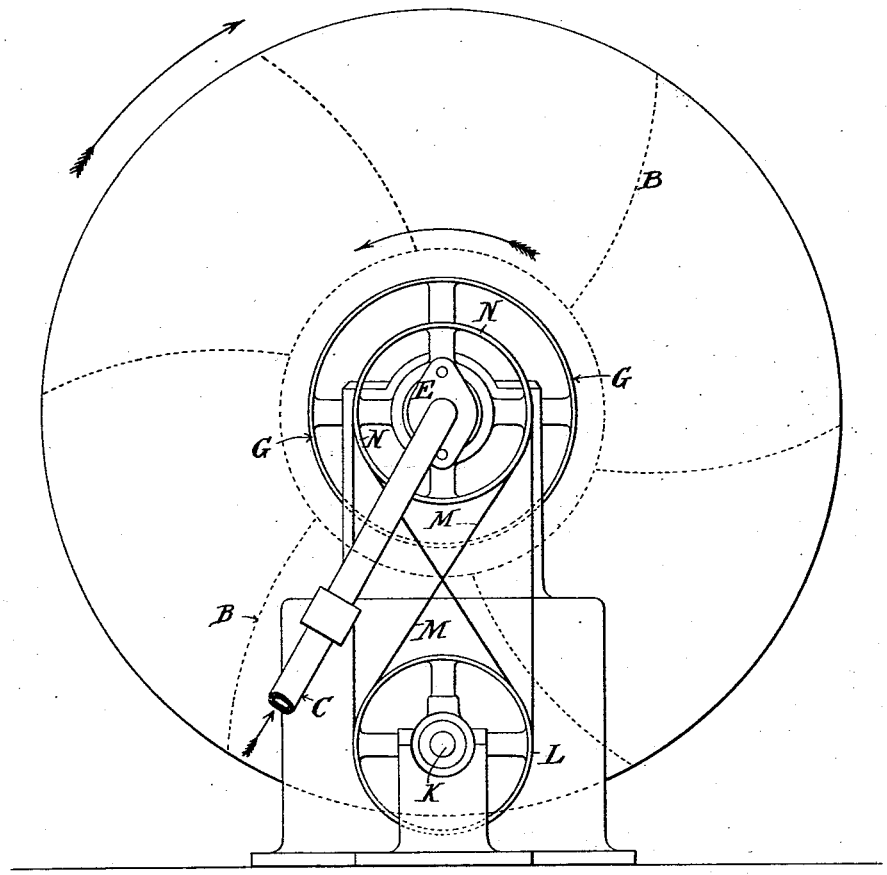

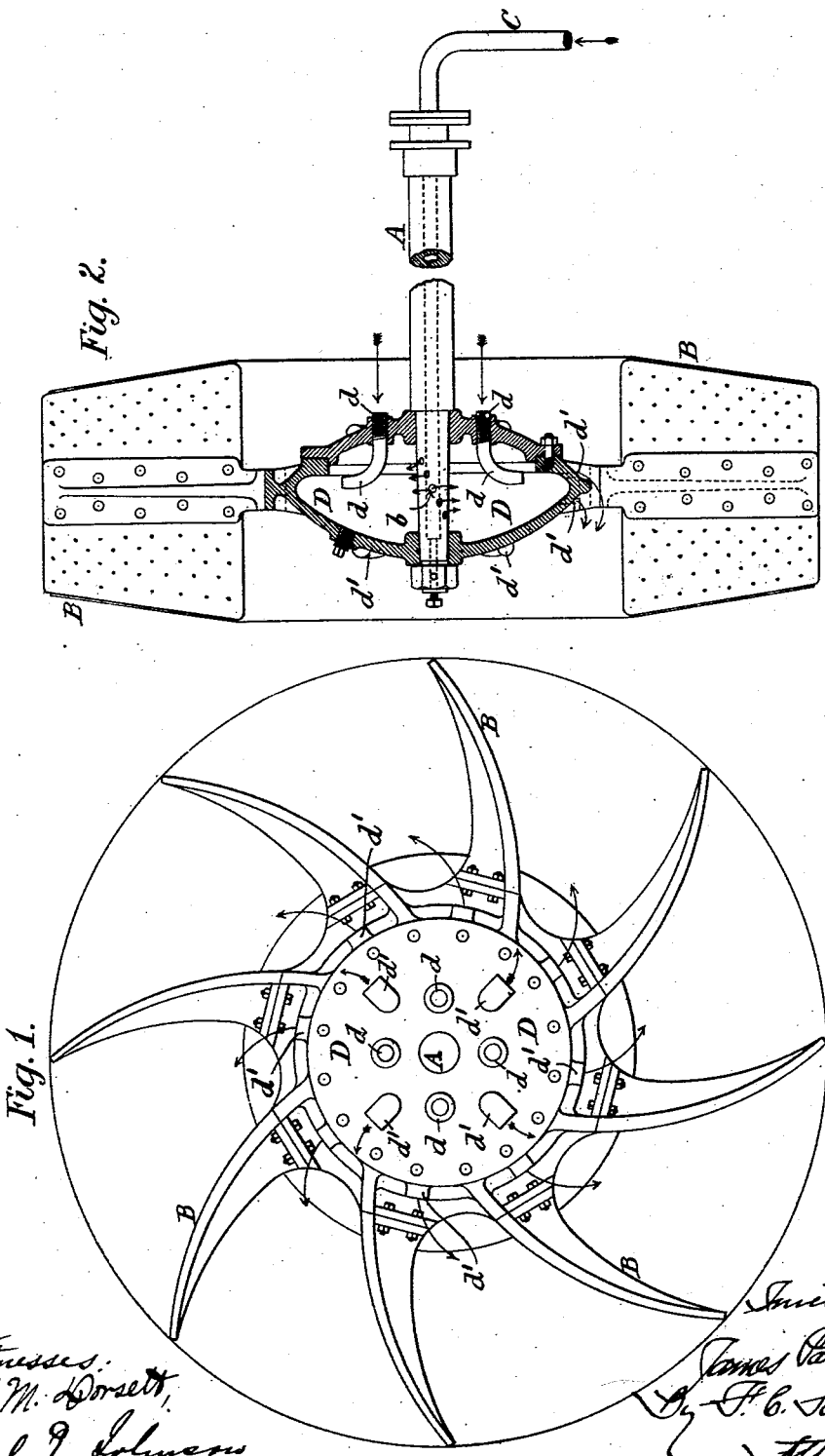

(No Model.) 6 Sheets—Sheet 2.
J. PATTERSON.
APPARATUS FOR TREATING FIRE GASES EVOLVED IN STEAM BOILERS, &c.
No. 572,176. Patented Dec. 1, 1896.
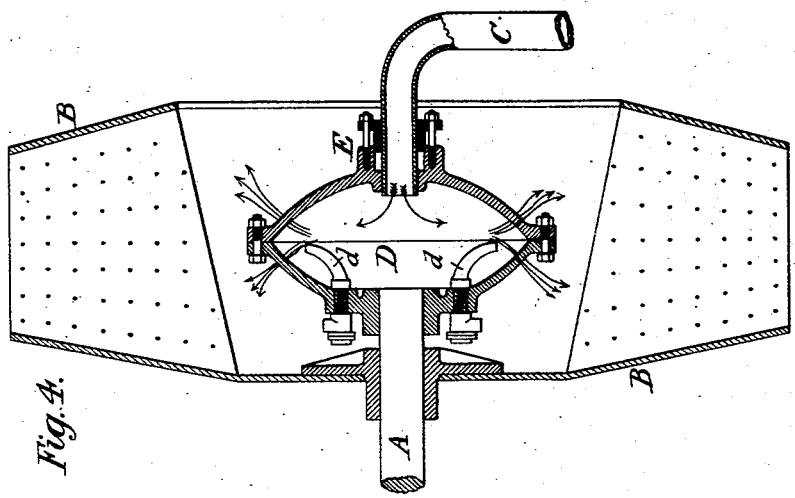
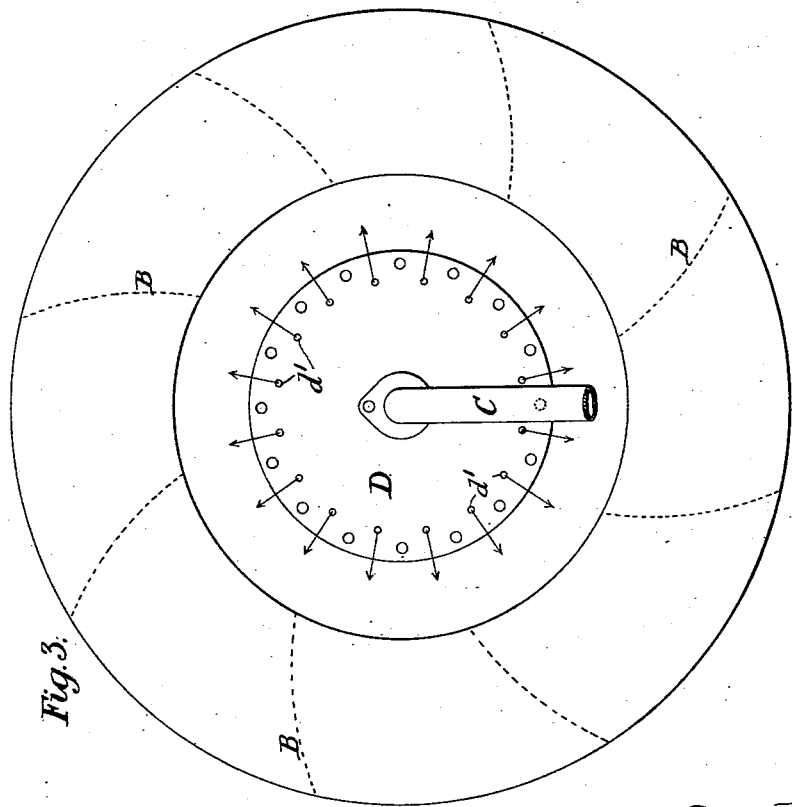

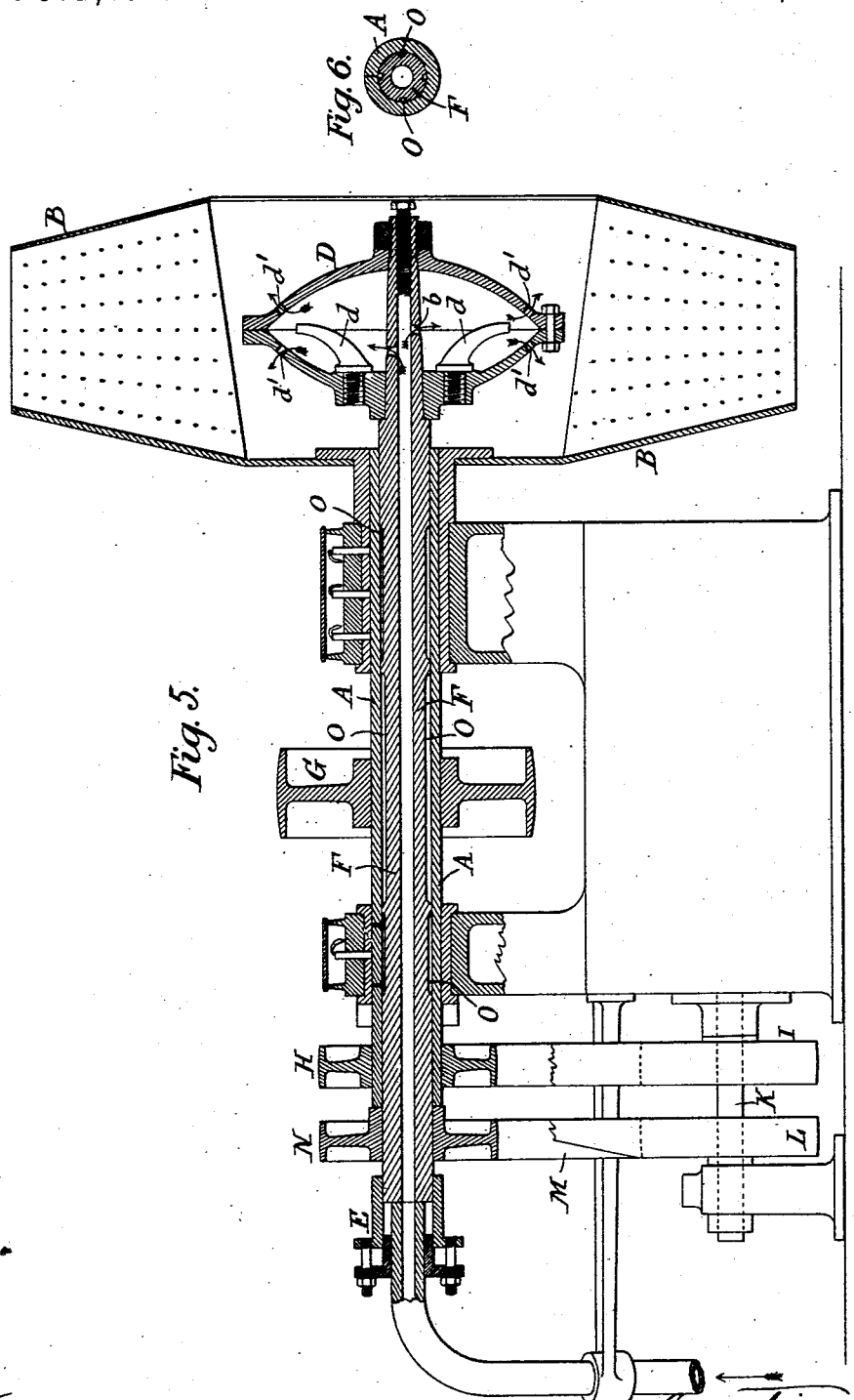

(No Model.) 6 Sheets—Sheet 4.
J. PATTERSON.
APPARATUS FOR TREATING FIRE GASES EVOLVED IN STEAM BOILERS, &c.
No. 572,176. Patented Dec. 1, 1896.

(No Model.) 6 Sheets—Sheet 5.
J. PATTERSON.
APPARATUS FOR TREATING FIRE GASES EVOLVED IN STEAM BOILERS, &c.
No. 572,176. Patented Dec. 1, 1896.
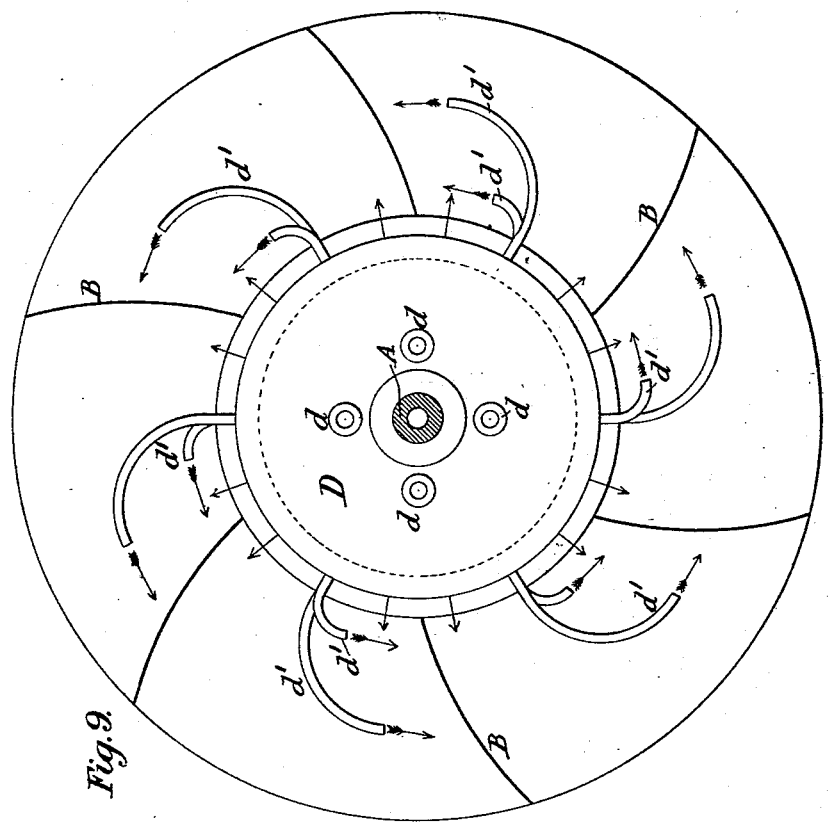
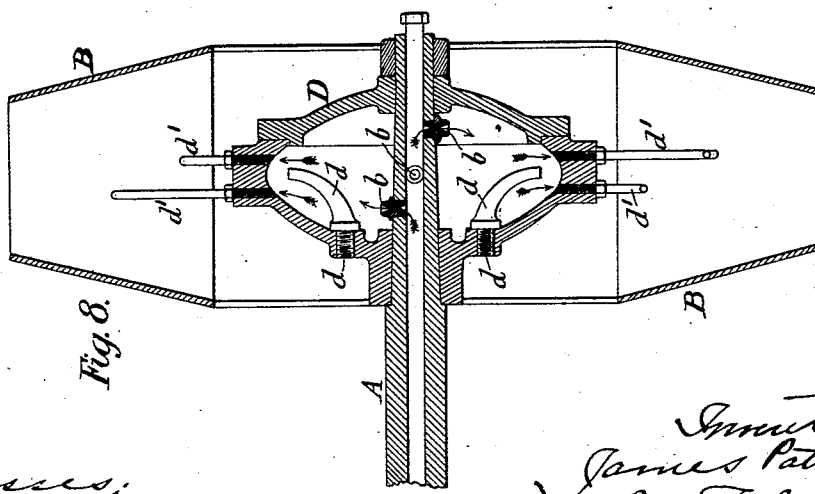
Witnesses:
S. M. Dorsett,
Paul E. Johnson
Inventor.
James Patterson
By F. C. Somes
Attorney (No Model.) 6 Sheets—Sheet 6.

J. PATTERSON.
APPARATUS FOR TREATING FIRE GASES EVOLVED IN STEAM BOILERS, &c.

No. 572,176. Patented Dec. 1, 1896.

Witnesses:
S. N. Pond.
A. R. Benson

Inventor.
James Patterson
By F. C. Somes
Attorney

UNITED STATES PATENT OFFICE.

JAMES PATTERSON, OF GLASGOW, SCOTLAND, ASSIGNOR OF ONE-HALF TO JAMES RAMSAY SANDILANDS, OF SAME PLACE.

APPARATUS FOR TREATING FIRE-GASES EVOLVED IN STEAM-BOILERS, &c.

SPECIFICATION forming part of Letters Patent No. 572,176, dated December 1, 1896.

Application filed April 3, 1895. Serial No. 544,330. (No model.) Patented in England September 25, 1894, No. 18,163; in France March 19, 1895, No. 245,911; in Belgium March 19, 1895, No. 114,627; in Germany March 19, 1895, No. 83,142; in Canada July 2, 1895, No. 49,355, and in Italy September 30, 1895, XXX, 39,714, and LXXVII, 500.

*To all whom it may concern:*

Be it known that I, JAMES PATTERSON, a subject of the Queen of Great Britain, residing at Glasgow, in the county of Lanark, Scotland, have invented certain new and useful Improvements in Apparatus for Treating the Fire-Gases Evolved in Steam-Boiler and other Furnaces, of which the following is a specification, for which I have obtained Letters Patent in the following countries, to wit: Great Britain, No. 18,163, dated September 25, 1894; France, No. 245,911, dated March 19, 1895; Belgium, No. 114,627, dated March 19, 1895; Germany, No. 83,142, dated March 19, 1895; Canada, No. 49,355, dated July 2, 1895, and Italy, No. 39,714, Vol. XXX, and No. 500, Vol. LXXVII, dated September 30, 1895.

This invention has for its object, by means of improved apparatus, to combine the producing or increasing of the draft with the separating of smoke, dust, or solid particles from the fire-gases evolved in steam-boiler and other furnaces.

In carrying out the invention a centrifugal fan or equivalent apparatus is arranged to draw in the fire-gases from the flue, uptake, funnel, or chimney, into which they pass on leaving the furnace or furnaces, and to discharge them through any suitable outlet. While passing through the fan, water, introduced in the form of jets, mingles with the fire-gases and separates smoke, dust, or solid particles from them and may also absorb any gaseous or vaporized constituents which are soluble.

The apparatus may be arranged in various ways to suit different boilers or furnaces. I will, however, as an example, describe an arrangement designed for a set of marine steam-boilers. In this arrangement the fan is erected above the boilers and is driven by a special steam or electric motor supported at one side of the fan upon a casting which also forms a water-tank. At the other side of the fan a communication is formed between the central part of the fan and the boiler-uptake, and dampers or valves are provided, such that the communication with the fan can be opened and the direct passage upward to the funnel be closed, or vice versa. The fan is preferably of a special construction adapted to withstand without injury the actions of the hot fire-gases and of the water and is made with a hollow central part of cast-steel having a bolted-on cover at one side and formed with flanged parts, to which are bolted curved arms having the fan-blades riveted to them. The water enters the hollow central part of the fan through the shaft, which is made tubular and has holes in it within the central part, the water thus passing through the shaft also serving to prevent overheating of the shaft-journals.

The water issues from the hollow center of the fan through jet-orifices between the blades, and holes are made in suitable positions in the sides of the hollow center to admit air or gas from the fan-casing to prevent the water from hanging in the hollow center. The action of the jets, combined with the rapid rotation of the fan, causes the water to be formed into spray and to be uniformly distributed among the fire-gases which the fan draws from the uptake. The water, or a large part of it, with what it separates or absorbs from the fire-gases, descends to the lower part of the fan-casing and finds its way through a pipe to the outside of the ship. Before being discharged from the apparatus the gases with the water and matters suspended in them pass through perforated or permeable screens to complete the separation of the solid constituents, such screens being arranged in inclined or other positions, and some or all of them being fitted so that they can be withdrawn through narrow or covered openings for the purpose of being cleaned. The casing of the fan is preferably made with an inwardly dished or coned part on the side opposite to that at which the fire-gases enter, so that the bearing may be as near the center of the fan as possible, while it is protected from the heat. The action of the water in the fan increases the propelling action of the fan on the fire-gases.

The steam-boilers to which the apparatus is applied may be of either the fire-gas-tube or water-tube types. In some cases, as, for example, with a set of land boilers, the apparatus may be made in duplicate and so that either part may be in use when the other part is being cleaned or repaired.

In a modification serving as an example of the application of my invention to land boilers a series of fire-gas-tube or water-tube boilers are arranged side by side and the fire-gases from all of them pass through an ordinary fuel-economizer and thence through the apparatus situated beyond the end of the range of boilers, or in any other convenient position. In connection with the tank or receiver through which the gases pass after being acted upon by the fan and in which the water separates there is arranged at a slightly lower level a collecting vessel in which solid matters are deposited from the water and from which such matters may be removed from time to time. The water from which matters are deposited in the collecting vessel may pass on through an overflow or trap valve into a tank or reservoir, from which it can be drawn to be used over again.

In order that the invention may be fully understood, I will now proceed to describe same by the aid of the accompanying drawings, which illustrate different methods of carrying such invention into effect.

Figures 1 and 2 of such drawings illustrate a suitable construction of the fan employed, respectively, in side elevation and transverse section, the fan-casing not being shown, but the gases to be treated entering such casing at the center by the inducing action due to the rotation of the fan-blades in the usual manner.

The shaft A, on which the fan-blades B are mounted, is hollow, and to it water from any suitable source is admitted through the pipe C. The end of shaft A terminates within an enlargement or hollow hub D, forming part with the fan-blades B, and such end of the shaft is provided with perforations or openings $b$, through which the water supplied through the hollow shaft issues, and, entering the hollow hub D, is by centrifugal action due to the rotation of such hub and fan-blades thrown outward against the wall of the hub. Openings $d$ toward the center of the hollow hub D permit air or gases to enter such hub from the fan-casing. Openings $d'$ are also formed in hub D.

The action is as follows: The water entering through pipe C issues through the openings $b$ and is thrown outward against the inner wall of the hollow hub D, thus creating a partial vacuum within the latter. The air or gases in the fan-casing then entering the hollow hub through the openings $d$ behind the water permits same to be thrown out through the openings $d'$, and such water, being beaten up by the revolving blades B, is caused to intimately commingle with the gases in the fan-casing to be treated, which will thus be deprived of their solid or soluble constituents before leaving the fan-casing through the ordinary exit-orifice.

The openings $d$ for the entrance of air or gases to the interior of the hub D are preferably fitted with valves automatically opening inward when a certain vacuum has been formed therein.

Figs. 3 and 4 are respectively a side elevation and transverse section of a modified form of fan, in which the water is admitted to the hub D through the pipe C from the opposite side to that where such hub is mounted on shaft A, such pipe C working in a gland E. The action is the same as in the arrangement previously described.

Figs. 5, 6, and 7 show a further modification of fan suitable for the purposes of this invention, Fig. 5 being a longitudinal section thereof; Fig. 6, a transverse section through the fan-spindle, and Fig. 7 an end view of such modification. In this arrangement the fan-blades B are carried on one spindle or shaft A, while the hub D, through which the water issues, is carried by a separate spindle F, the spindles A and F being caused to rotate in opposite directions, the object being to further facilitate the commingling or churning up of the gases to be treated and the water. The shafts A and F may be driven in opposite directions by any suitable means, the arrangement shown in the drawings consisting of a pulley G, fast on the blade-spindle A, and actuated from any suitable motor, the movement of such shaft A being transmitted by pulley H (also mounted on shaft A) to pulley I on an intermediate shaft K, and thence by pulley L on same shaft K by a cross-belt M to a pulley N on the hub-spindle F. The hub-spindle F will preferably be provided with lubricating gutters or channels O.

Figs. 8 and 9 are respectively a longitudinal section and end view of an arrangement of fan in which the water issuing from the central hub D is caused to strike the blades B in the direction of rotation of the latter, serving to keep the fan-blades clean from any deposit which might otherwise accumulate thereon. For this purpose the openings $d'$, through which such water issues from central hub D, are in the form of tubes curved or bent in the direction of rotation of the fan-blades B.

Figure 12:
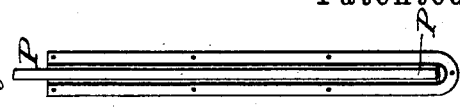
Figure 11:
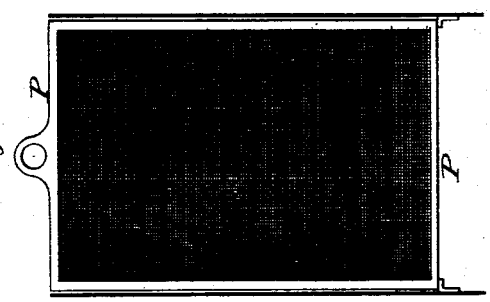
Figure 10:
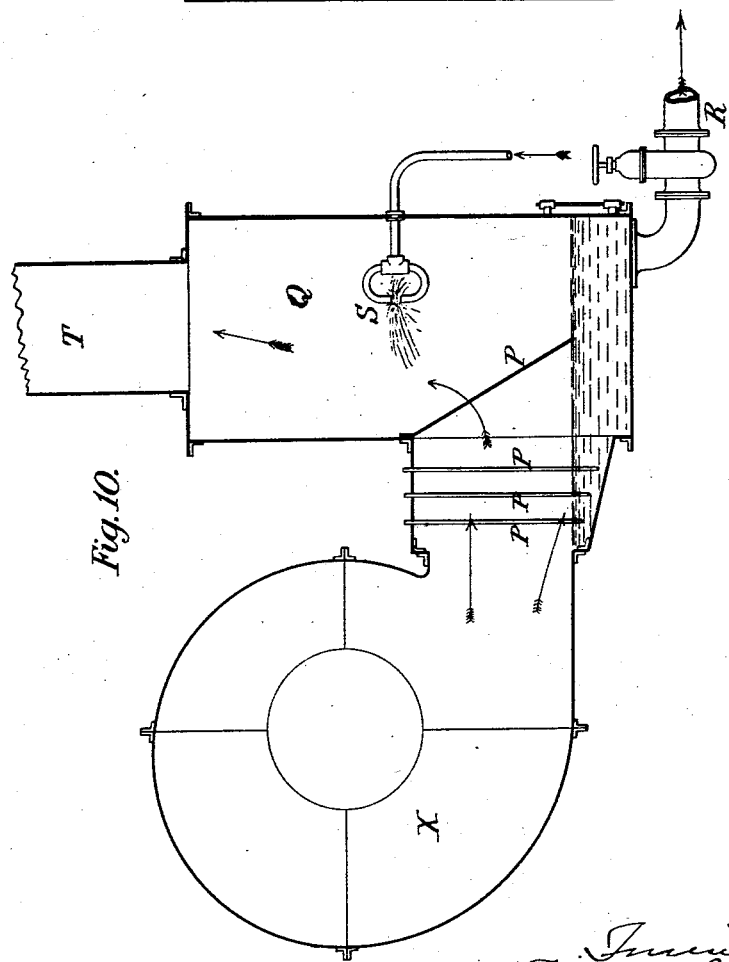

Fig. 10 is a longitudinal section showing the fan applied to a receiver in which the water, after having absorbed the solid constituents and soluble portions of the gases in the fan, accumulates, and an arrangement of screens through which the mingled gases and water are preferably caused to pass on their way to the chimney or uptake, so as to separate the water and what it has absorbed or taken up from such constituents of the products of combustion which it has been unable to deal with. Figs. 11 and 12 are respectively a front elevation and end view of one of the screens suitable for the purpose.

It will be seen that the gases and water on their passage from the fan X pass through screens P, (preferably of a sieve-like construction, as shown in Fig. 11, and of a material which may vary with the nature of the gases to be dealt with,) the lower ends of which dip into water contained in the bottom of the receiver Q. All or any of such screens P may be fitted so that same may be readily removed for cleaning or repair when necessary.

An outlet R at bottom of receiver Q enables the water and the matters contained therein to be run off when desired.

The receiver Q may have a water-spraying device S of any suitable construction arranged therein for the purpose of submitting the gases treated as above described to a final action before they proceed to the chimney or uptake T, such water (with whatever it may have absorbed or taken up) falling down into the water and other matters which have been previously separated from such gases on their passage through the screens P.

What I claim as my invention, and desire to secure by Letters Patent, is—

1. The combination of a casing connected with a flue or passage through which gases to be treated pass, a fan disposed in said casing and provided with a hollow hub having discharge-openings, means for supplying water to said hub, and means for admitting air to said hollow hub.

2. The combination of a casing connected with a flue or passage through which gases to be treated pass, a fan disposed in said casing and provided with a hollow hub, having discharge-openings, a hollow spindle connected with said hub for supplying water thereto, and means for admitting air to said hub.

3. The combination of a casing connected with a flue or passage through which gases to be treated pass, a fan disposed in said casing and provided with a hollow hub having discharge-openings, a hollow spindle extending into said hub and connected with a suitable water-supply, said spindle having openings therein for discharging water into said hub, said hub having openings for permitting the air or gases to enter the hub from the fan-casing.

4. The combination of a casing connected with a flue or passage through which gases to be treated pass, a fan disposed in said casing and having a hollow blade-carrying spindle, means for rotating said spindle in one direction, a hollow spindle disposed in said blade-carrying spindle, and connected with a suitable water-supply, said spindle having openings in one end thereof, means for rotating said spindle in the opposite direction to the direction of the blade-carrying spindle, and a hollow hub into which the perforated end of said spindle extends, said hub being provided with openings.

5. The combination of a casing connected with a flue or passage through which gases to be treated pass, a revolving fan disposed in said casing and provided with a hollow spindle connected with a suitable water-supply, a hollow hub into which the fan-spindle extends and which carries the fan-blades, said hub having openings therein directed in the direction in which the fan-blades rotate, said openings serving to permit the water entering the spindle to issue therethrough into the fan-casing, and openings in said hub for permitting the air or gases to enter the hub from the fan-casing.

JAMES PATTERSON.

Witnesses:
GEORGE YUILL,
R. S. TOWNSEND.